(12) United States Patent
Galeev et al.

(10) Patent No.: US 12,519,736 B2
(45) Date of Patent: Jan. 6, 2026

(54) DYNAMIC ADAPTATION OF TIME-AWARE COMMUNICATIONS IN TIME-SENSITIVE SYSTEMS

(71) Applicant: Intel Corporation, Santa Clara, CA (US)

(72) Inventors: Mikhail Tagirovich Galeev, Beaverton, OR (US); Javier Perez-Ramirez, North Plains, OR (US); Javier Felip Leon, Hillsboro, OR (US); Dave Cavalcanti, Portland, OR (US); David Israel González Aguirre, Hillsboro, OR (US); Mark Eisen, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1237 days.

(21) Appl. No.: 17/126,142

(22) Filed: Dec. 18, 2020

(65) Prior Publication Data

US 2022/0200920 A1 Jun. 23, 2022

(51) Int. Cl.
*H04L 47/28* (2022.01)
*H04L 1/00* (2006.01)
*H04L 27/26* (2006.01)
*H04L 47/22* (2022.01)
*H04L 47/2416* (2022.01)
*H04L 47/27* (2022.01)
*H04L 47/283* (2022.01)

(52) U.S. Cl.
CPC .......... *H04L 47/283* (2013.01); *H04L 1/0003* (2013.01); *H04L 27/2607* (2013.01); *H04L 47/22* (2013.01); *H04L 47/2416* (2013.01); *H04L 47/27* (2013.01)

(58) Field of Classification Search
None
See application file for complete search history.

(56) References Cited

U.S. PATENT DOCUMENTS

| 7,613,242 | B2 * | 11/2009 | Bykovnikov | ........... H04L 5/026 375/260 |
| 9,210,012 | B2 * | 12/2015 | Pustovalov | ....... H04L 25/03885 |
| 2019/0322299 | A1 * | 10/2019 | Mong | ................. B61L 15/0072 |

OTHER PUBLICATIONS

I. Sammour et al.; "Evaluation of Rate Adaptation Algorithms in IEEE 802.11 Networks"; Electronics 2020, vol. 9, Issue 9, 1436; Sep. 3, 2020; 16 pages.

(Continued)

*Primary Examiner* — Yemane Mesfin
(74) *Attorney, Agent, or Firm* — Viering, Jentschura & Partner mbB

(57) ABSTRACT

A device may determine a plurality of link settings for a communication link within a time sensitive network. The device may determine a threshold value for the communication link based on the plurality of link settings. The device may determine a current value of a parameter of the communication link based on the plurality of link settings. The device may compare the current value of the parameter to a threshold value. Responsive to the current value of the parameter being less than the threshold value, the device may successively update a link setting of the plurality of link settings to cause the current value of the parameter to approach the threshold value.

12 Claims, 9 Drawing Sheets

(56) References Cited

OTHER PUBLICATIONS

D. Xia et al.; "Evaluation of the Minstrel rate adaptation algorithm in IEEE 802.11g WLANs"; 2013 Institute of Electrical and Electronics Engineers (IEEE) International Conference on Communications (ICC); Jun. 2013; 6 pages; Budapest.

D. Xia et al.; "On the performance of rate control algorithm Minstrel"; 2012 Institute of Electrical and Electronics Engineers (IEEE) 23rd International Symposium on Personal, Indoor and Mobile Radio Communications—(PIMRC), Sep. 2012, pp. 406-412, Sydney.

3rd Generation Partnership Project, "Technical Specification Group Services and System Aspects, Policy and charging control framework for the 5G System (5GS)", dated Dec. 2020, 120 pages, V16.7.0, Stage 2, Release 16, TS23.503.

European Search Report issued for the corresponding European Application No. 21 19 5022, dated Jan. 26, 2022, 1 page (for informational purposes only).

* cited by examiner

DYNAMIC ADAPTATION OF TIME-AWARE COMMUNICATIONS IN TIME-SENSITIVE SYSTEMS

TECHNICAL FIELD

The aspects discussed in the present disclosure are related to dynamic adaptation of time-aware communications in time-sensitive systems.

BACKGROUND

Unless otherwise indicated in the present disclosure, the materials described in the present disclosure are not prior art to the claims in the present application and are not admitted to be prior art by inclusion in this section.

A time sensitive network (TSN) may include a centralized user configuration (CUC) device, a centralized network configuration (CNC) device, one or more bridges, and end devices that are communicatively coupled. The CUC device, the CNC device, the bridges, and the end devices may be communicatively coupled via one or more communication links (e.g., channels). The bridges may communicatively couple the end devices via the communication link. The CUC device may be communicatively coupled to the CNC and the end devices. The CNC device may be communicatively coupled to the bridges.

The subject matter claimed in the present disclosure is not limited to aspects that solve any disadvantages or that operate only in environments such as those described above. Rather, this background is only provided to illustrate one example technology area where some aspects described in the present disclosure may be practiced.

BRIEF DESCRIPTION OF THE DRAWINGS

Exemplary aspects will be described and explained with additional specificity and detail through the use of the accompanying drawings in which.

DETAILED DESCRIPTION

Figure 1:
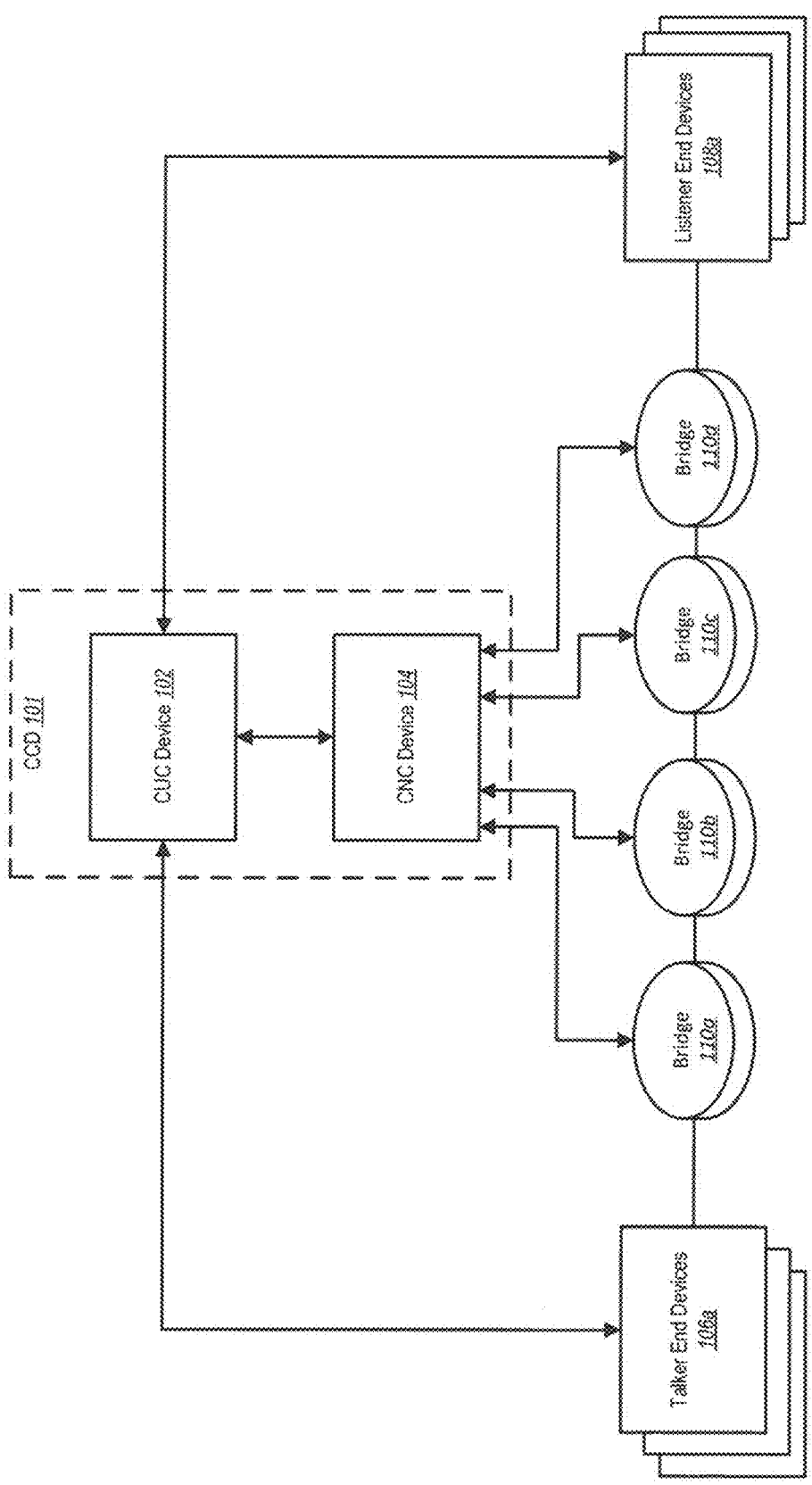
FIG. 1 illustrates a block diagram of an exemplary time sensitive network (TSN)

The following detailed description refers to the accompanying drawings that show, by way of illustration, exemplary details in which aspects of the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A TSN may include a CUC device, a CNC device, one or more bridges, and end devices (e.g., a listener end device, a talker end device, etc.) that are communicatively coupled. In some aspects, the end devices may include a base station (BS), an access point (AP), or some combination thereof. The CUC device may be communicatively coupled to the CNC and the end devices. The CNC device may be communicatively coupled to the bridges. The CNC device and the CUC device may form a centralized configuration device (CCD). The CCD, the bridges, and the end devices may be communicatively coupled via one or more communication links (e.g., channels). The bridges may communicatively couple the end devices via the communication link. The CCD may manage communication between the end devices and the bridges.

The CCD may provision one or more link settings, one or more parameters, or some combination thereof of the communication link to manage communication via the communication link. In addition, the CCD may control one or more parameters of the end devices, the bridges, the communication link, or some combination thereof to manage the communication link. In some aspects, the CCD may implement Industry 4.0 if the TSN includes an industrial Internet of things (IOT) network. The CCD may provision a synchronization setting, a bounded latency setting, a reliability setting, a resource management, or some combination thereof of the end devices, the bridges, or some combination thereof. The CCD may implement a quality of service (QoS) mechanism to reduce congestion loss (e.g., zero congestion loss), achieve deterministic latency, achieve minimal jitter, or some combination thereof on the communication link.

In some aspects, the CCD may implement the synchronization settings in accordance with institute of electrical and electronics engineers (IEEE) 802.1AS. In these and other aspects, the CCD may implement the bounded latency settings in accordance with IEEE 802.1Qbv. Further, in some aspects, the CCD may implement the reliability settings in accordance with IEEE 802.1CB. In these and other aspects, the CCD may implement the resource management settings in accordance with IEEE 802.1Qcc.

The end devices may transmit and receive traffic (e.g., packets) on the communication link. The traffic may include time triggered (TT) traffic and non-TT traffic. In some aspects, the CCD may configure the link settings specifically for the TT traffic. The link settings may include one or more parameters. For example, the parameters may include a protected window (PW) (e.g., a period of time) dedicated specifically for the TT traffic. The parameters may also include a guard band (GB) that occurs prior to the PW. The GB may be implemented to ensure transmission of non-TT traffic is completed prior to the PW. The CCD may implement duplicate frames that are transmitted using multiple communication links, 1–1 or 1+N communication link redundancy, or some combination thereof to transmit the traffic.

In addition, the CCD may provision the communication link based on channel quality, end device settings, or some combination thereof. In some aspects, the channel quality may include a signal to noise ratio (SNR) of the communication link. In these and other aspects, the end device settings may include thermal throttling of the end devices. The link settings may dynamically change capabilities (e.g. a data rate, a packet error rate, etc.) of the communication link.

In some aspects, an electronic device (e.g., the CCD or the end devices) may control a modulation and coding scheme (MCS) used on the communication link. The electronic device may control the MCS to control efficiency, reliability, throughput, or some combination thereof of the communication link. For example, if the electronic device increases the MCS, the efficiency of the communication link may increase but the reliability of the communication link may decrease. As another example, if the electronic device decreases the MCS, the efficiency of the communication link may decrease but the reliability of the communication link may increase.

The CCD may implement the link settings, the parameters, or some combination thereof to balance latency, reliability, and throughput of the communication link. However, some CCD technology may implement the PW as a fixed period of time regardless of current settings. In addition, some CCD technology may adjust the link settings, the parameters, or some combination thereof in the scale of multiple seconds or greater. Further, some CCD technology may increase a duration of the GB, which may increase a period of time that the traffic is not being transmitted (e.g., a quiet time) on the communication link. Increasing the duration of the GB may reduce capacity, throughput, or some combination thereof of the communication link.

Some electronic device technology may select a current MCS based on the settings independent of traffic type (e.g., whether the traffic is TT traffic or non-TT traffic). For example some electronic device technology may control transmission of probe traffic to measure the channel quality. This electronic device technology may select the current MCS based on the channel quality. Some electronic device technology may select the MCS to increase throughput even if the selected MCS may increase a packet error rate (PER) of the communication link.

Some electronic device technology may implement an implicit feedback-type in which traffic may be transmitted according to a particular MCS rate. If the traffic is not successfully transmitted, the electronic device technology may cause the traffic to be transmitted according to another MCS rate. The electronic device technology may repeat this process until the traffic is successfully received. This electronic device technology may determine a probability of successful transmission and the measured throughput for each MCS rate. This electronic device technology may determine the MCS rate that is most likely to achieve a particular throughput of the communication link.

Some aspects described in the present disclosure may include a CCD that dynamically updates the link settings, the parameters, or some combination thereof based on threshold values that correspond to the parameters. The CCD may dynamically update the link settings, the parameters, or some combination thereof based on a time-aware scheduling based on the parameters. In some aspects, the CCD may update the link settings, the parameters, or some combination thereof to increase capacity of the communication link, ensure latency, increase reliability, or some combination thereof.

In some aspects, the CCD may control a duration of the PW, an amount of TT traffic that is to be transmitted during the PW, or some combination thereof. In these and other aspects, the CCD may perform various operations within the medium access control (MAC) layer, the physical (PHY) layer, or some combination thereof. The CCD may determine current link settings, current parameters, or some combination thereof. In addition, the CCD may compare the current parameters to corresponding threshold values. The CCD may instruct the bridges, the end devices, or some combination thereof to change one or more link settings based on the comparison. For example, if the CCD determines reliability of the communication link may increase for the PW, the CCD may control the link settings to reduce the duration of the PW to increase efficiency. As another example, if the CCD determines reliability of the communication link may decrease for the PW, the CCD may control the link settings to increase the duration of the PW to increase reliability during the PW.

The CCD may include a memory and one or more processors. The memory may include computer-readable instructions stored thereon. The one or more processors may be coupled to the memory. In addition, the one or more processors may read and execute the computer-readable instructions to perform or control performance of operations as described in the present disclosure. The CCD may determine link settings for a communication link within a TSN. In addition, the CCD may determine threshold values for the communication link based on the link settings. Further, the CCD may determine a current value of one or more parameters of the communication link. The CCD may determine the current values based on the link settings. The CCD may compare the current values of the parameters to corresponding threshold values. Responsive to one or more current values being less than the corresponding threshold values, the CCD may successively update one or more of the link settings. The CCD may successively update the link settings to cause one or more of the current values to approach the corresponding threshold values.

In some aspects, an electronic device may determine the link settings for the communication link within the TSN. The electronic device may determine a PW duration. The CCD may determine the PW duration based on the link settings. In some aspects, the PW duration may include a fixed duration for a short period of time. In addition, the electronic device may determine a delay time (DT) duration based on the link settings. The DT duration may include a variable duration. Further, the electronic device may determine a time buffer (TB) duration based on the link settings. The TB buffer duration may include a variable duration. The electronic device may successively update the PW duration to increase a schedule efficiency of the communication link within the TSN.

In some aspects, the electronic device may implement a differentiated approach to select a current MCS based on a type of the traffic on the communication link. For example, the electronic device, for TT traffic, may select the current MCS to increase (e.g., optimize) efficiency with bounded latency of the communication link.

The electronic device may determine a current MCS for non-TT traffic within the communication link that includes the electronic device within the TSN. The electronic device may determine a current traffic type for the communication link. In addition, responsive to the current traffic type being TT traffic, the electronic device may select a MCS that increases reliability of transmission of the TT traffic compared to the non-TT traffic. Further, the electronic device may modulate the TT traffic according to the selected MCS.

At least one aspect described in the present disclosure may increase capacity of the communication link while maintaining bounded latency, reliability, or some combination thereof. In addition, at least one aspect described in the present disclosure may improve efficiency of the communication of the link while providing deterministic QoS for time-critical traffic. Further, at least one aspect described in the present disclosure may ensure reliability, efficiency, or any other appropriate feature of the communication link by controlling a rate of change between MCSs.

These and other aspects of the present disclosure will be explained with reference to the accompanying figures. It is to be understood that the figures are diagrammatic and schematic representations of such example aspects, and are not limiting, nor are they necessarily drawn to scale. In the figures, features with like numbers indicate like structure and function unless described otherwise.

FIG. 1 illustrates a block diagram of an exemplary TSN 100, in accordance with at least one aspect described in the present disclosure. The TSN 100 may include a CUC device 102, a CNC device 104, talker end devices 106a-n, bridges 110a-d, and listener end devices 108a-n. The bridges 110a-d are generally referred to in the present disclosure as bridges 110. The talker end devices 106 and the listener end devices 108 are illustrated as single boxes for ease of illustration. The talker end devices 106 and the listener end devices 108 may include any appropriate number of devices without departing from the scope and spirit of the present disclosure.

The CUC device 102 may include a memory (not illustrated), one or more processors (not illustrated), or some combination thereof. The CNC device 104 may include a memory (not illustrated), one or more processors (not illustrated), or some combination thereof. The processors may be operatively coupled to the corresponding memories. The CNC device 102 may be communicatively coupled to the bridges 110. The CUC device 104 may be communicatively coupled to the CNC device 104, the talker end devices 106, and the listener end devices 108. The CUC device 102 and the CNC device 104 may form a CCD 101. The bridges 110 may communicatively couple the talker end devices 106 with the listener end devices 108.

The CCD 101 (e.g., the CUD device 102, the CNC device, or some combination thereof) may determine link settings for the communication link that includes one or more of the talker end devices 106, one or more of the bridges 110, and one or more of the listener end device 108. In some aspects, the link settings may include a periodicity, a maximum PW size, a minimum PW size, a maximum GB size, a maximum GB size, and a current MCS. The PW may be configured to permit TT traffic (e.g., time critical traffic) to be transmitted without non-TT traffic potentially causing interference on the communication link. The PW may include a bounded latency for the TT traffic.

The CCD 101 may determine threshold values for the communication link based on the link settings. The CCD 101 may determine a current value of one or more parameters of the communication link based on the link settings. The parameters may include at least one of a TB duration, a PW efficiency, and a GB efficiency. The CCD 101 may compare the current values to corresponding threshold values. Responsive to one or more of the current values being less than the corresponding threshold value, the CCD 101 may successively update one or more of the link settings to cause the corresponding current value to approach the corresponding threshold value.

In some aspects, the CCD 101 may determine the PW duration based on the link settings. In these and other aspects, the PW duration may include a fixed duration for a short period of time. The CCD 101 may determine a DT duration based on the link settings. The DT duration may include a variable duration. The CCD 101 may determine the TB duration based on the link settings. The TB buffer duration may include a variable duration. The CCD 101 may successively update the PW duration to increase a schedule efficiency of the communication link.

Figure 2:
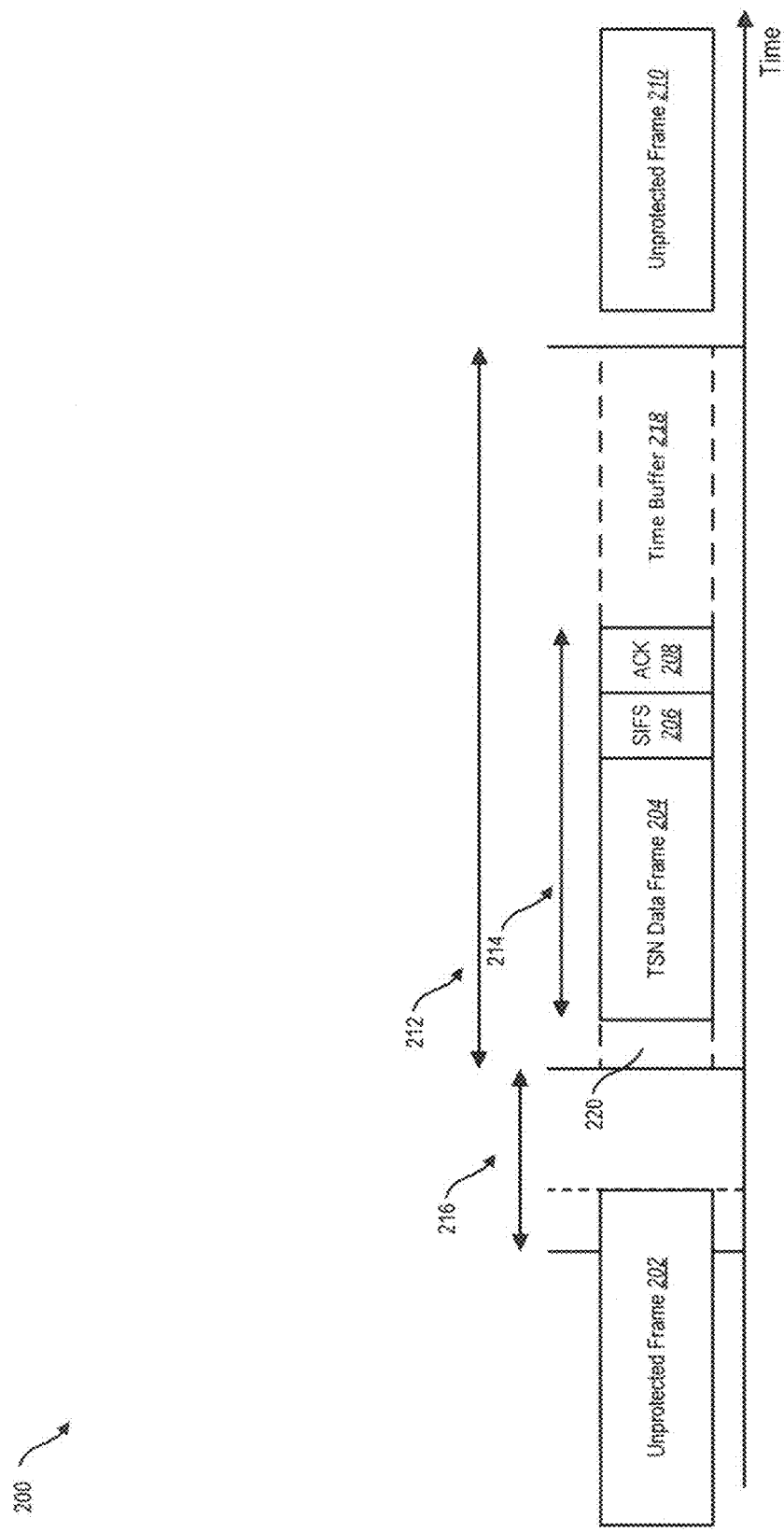
FIG. 2 illustrates an exemplary traffic sequence for communication within the TSN of FIG. 1.

FIG. 2 illustrates an exemplary traffic sequence 200 for communication within the TSN 100 of FIG. 1, in accordance with at least one aspect described in the present disclosure. The traffic sequence 200 may include an unprotected frame 202, a TSN data frame 204, a short interframe space (SIFS) 206, an acknowledge (ACK) frame 208 (labelled as ACK 208 in FIG. 2 for ease of illustration), a time buffer 218, an unprotected frame 210, and a DT 220. In addition, the traffic sequence 200 may include a GB 216, an entire PW 212, and a reduced PW 214.

The DT 220 may include a period of time between a start of the entire PW 212 and a start of the TSN data frame 204. The DT 220 may include an initial channel access delay time prior to the TT traffic (e.g., the time critical traffic) being transmitted. The time buffer 218 may include a period of time between an end of the ACK frame 208 and an end of the entire PW 212. The entire PW 212 may include a period of time (e.g., a PW duration) specifically for transmitting the TT traffic (e.g., the TSN data frame 204). To increase efficiency, reliability, capacity, or any other feature of the communication link, the PW duration may be reduced from the period of time corresponding to the entire PW 212 to the period of time corresponding to the reduce PW 214. The GB 216 may ensure the unprotected frame 202 (e.g., previous transmissions) is completed prior to the PW duration starting.

Figure 3:
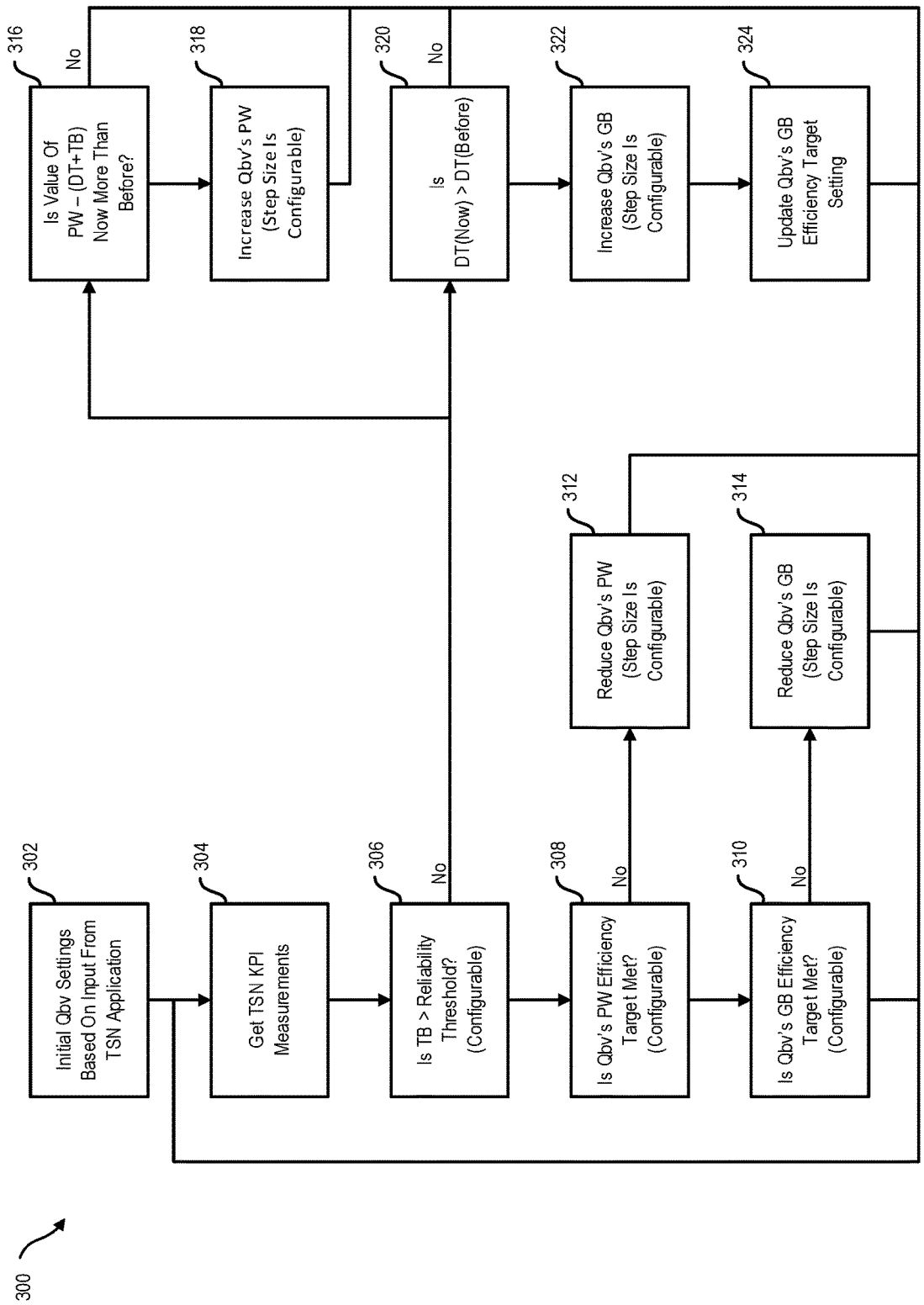
FIG. 3 illustrates an exemplary flowchart of a method to dynamically update settings within the TSN of FIG. 1.

FIG. 3 illustrates an exemplary flowchart of a method 300 to dynamically update settings within the TSN 100 of FIG. 1, in accordance with at least one aspect described in the present disclosure. The method 300 may be performed by any suitable system, apparatus, or device with respect to dynamically update settings within the TSN. For example, the CCD 101 of FIG. 1 may perform or direct performance of one or more of the operations associated with the method 300. The method 300 may include one or more blocks 302, 304, 306, 308, 310, 312, 314, 316, 318, 320, 322, 324, or some combination thereof. Although illustrated with discrete blocks, the operations associated with one or more of the blocks of the method 300 may be divided into additional blocks, combined into fewer blocks, or eliminated, depending on the particular implementation. In some aspects, the method 300 may performed to determine and update a schedule efficiency of the communication link.

At block 302, the CCD 101 may determine initial Qbv settings of a communication link. In some aspects, the CCD 101 may determine the initial Qbv settings based on input from a TSN application within the CCD 101. In these and other aspects, the initial Qvb settings may include a periodicity, the PW duration, the GB duration, or some combination thereof.

At block 304, the CCD 101 may get TSN key performance indicator (KPI) measurements (e.g., one or more parameters of the communication link). For example, the CCD 101 may determine the parameters based on the initial Qbv settings. In some aspects, the parameters may include the TB duration, a PW efficiency, a GB efficiency, or some combination thereof.

At block 306, the CCD 101 may determine whether the TB duration (e.g., the TB) is greater than a reliability threshold (e.g., a reliability threshold value). In some aspects, the reliability threshold value may be configurable based on user input, pre-defined settings, the initial Qbv settings, or some combination thereof. In some aspects, the reliability threshold value may include a pre-defined reliability threshold value. If the TB duration is greater than the reliability threshold value, block 306 may be followed by block 308. If the TB duration is less than or equal to the reliability threshold value, block 306 may be followed by block 316 and block 320.

At block 308, the CCD 101 may determine whether Qbv's PW efficiency (e.g., the PW efficiency) target is met. In some aspects, the CCD 101 may determine whether the PW efficiency is greater than a pre-defined PW efficiency threshold value. The CCD may determine the PW efficiency according to Equation 1.

$$\max\{1-(DT+TB)/PW\} \qquad \text{Equation 1}$$

In Equation 1, DT represents the DT duration, TB represents the TB duration, and PW represents the PW duration.

If the PW efficiency is greater than the PW efficiency threshold value, block 308 may be followed by block 310. If the PW efficiency is less than or equal to the PW efficiency threshold value, block 308 may be followed by block 312.

At block 310, the CCD 101 may determine whether Qbv's GB efficiency (e.g., the GB efficiency) target is met. In some aspects, the CCD 101 may determine whether the GB efficiency is greater than a pre-defined GB efficiency threshold value. The CCD 101 may determine the GB efficiency according to Equation 2.

$$\min\{GB \ \& \ DT] \qquad \text{Equation 2}$$

In Equation 2, GB represents the GB duration and DT represent the DT duration.

If the GB efficiency is greater than the GB efficiency threshold value, block 310 may be followed by block 304. If the GB efficiency is less than or equal to the GB efficiency threshold value, block 310 may be followed by block 314.

At block 312, the CCD 101 may reduce Qbv's PW (e.g., the PW duration). In some aspects, the CCD 101 may reduce the PW duration by a pre-defined PW step size. In these and other aspects, the pre-defined PW step size may be configurable based on user input, pre-defined settings, the initial Qbv settings, or some combination thereof. In some aspects, the pre-defined PW step size may be based on a pre-defined granularity of the PW. Block 312 may be followed by block 304.

At block 314, the CCD 101 may reduce Qbv's GB (e.g., the GB duration). In some aspects, the CCD 101 may reduce the GB duration by a pre-defined GB step size. In these and other aspects, the pre-defined GB step size may be configurable based on user input, pre-defined settings, the initial Qbv settings, or some combination thereof. In some aspects, the pre-defined GB step size may be based on a pre-defined granularity of the GB. Block 314 may be followed by block 304.

At block 316, the CCD 101 may determine whether a current TB value (e.g., a value according to Equation 3) is more than before (e.g., greater than a previous TB value). The current TB value may be determined according to Equation 3.

$$PW-(DT+TB) \qquad \text{Equation 3}$$

In Equation 3, DT represents the DT duration, TB represents the TB duration, and PW represents the PW duration.

If the current TB value is greater than the previous TB value, block 316 may be followed by block 318. If the current TB value is less than or equal to the previous TB value, block 316 may be followed by block 304.

At block 318, the CCD 101 may increase Qbv's PW (e.g., the PW duration). In some aspects, the CCD 101 may increase the PW duration by the pre-defined PW step size. Block 318 may be followed by block 304.

At block 320, the CCD 101 may determine whether DT (now) (e.g., a current DT duration) is greater than DT (before) (e.g., a previous DT duration). The CCD 101 may determine the current DT based on the Qbv settings. If the current DT duration is greater than the previous DT duration, block 320 may be followed by block 322. If the current DT duration is less than or equal to the previous DT duration, block 320 may be followed by block 304.

At block 322, the CCD 101 may increase Qbv's GB (e.g., the GB duration). In some aspects, the CCD 101 may increase the GB duration by the pre-defined GB step size. Block 322 may be followed by block 324. At block 324, the CCD 101 may update Qbv's GB efficiency target setting (e.g., the GB efficiency threshold value). In some aspects, the Qbv's efficiency may be updated based on a pre-defined GB efficiency step size. The pre-defined GB efficiency may be based on a pre-defined granularity of the GB efficiency. Block 324 may be followed by block 304.

The CCD 101 may repeat the operations associated with blocks 304-324.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 4:
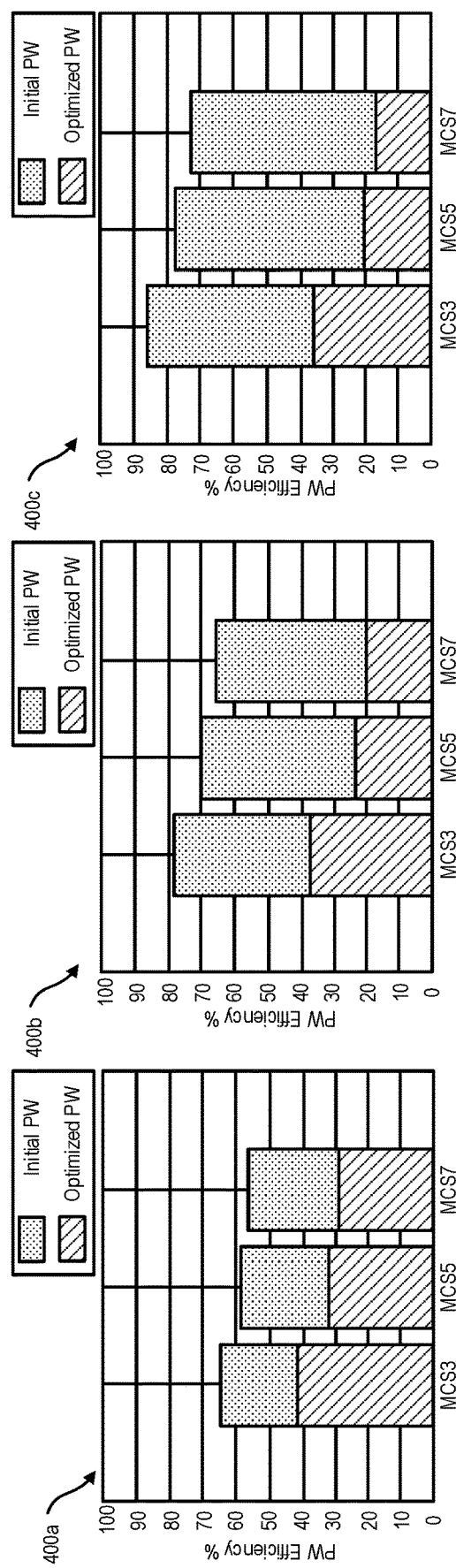
FIG. 4 illustrates graphical representations of protected window (PW) efficiency of a communication link for initial PWs and optimized PWs with various modulation and coding schemes (MCSs)

FIG. 4 illustrates graphical representations 400a-c of PW efficiency of a communication link for initial PWs and optimized PWs with various MCSs, in accordance with at least one aspect described in the present disclosure. The graphical representations 400a-c were obtained by simulating the PW duration for real world MCSs for TSN operation. For example, the MCSs include MCS3, MCS5, and MCS7. In addition, the simulations were performed using different physical service data units (PSDUs). Graphical illustration 400a illustrates the PW efficiency for the simulation using 1288 PSDU. Graphical illustration 400b illustrates the PW efficiency for the simulation using 5128 PSDU. Graphical illustration 400c illustrates the PW efficiency for the simulation using 10248 PSDU.

As illustrated in FIG. 4, the PW efficiency of the communication link increases (e.g., between fifty percent to three hundred percent) based on the different PSDUs and the different MCSs.

Figure 5:
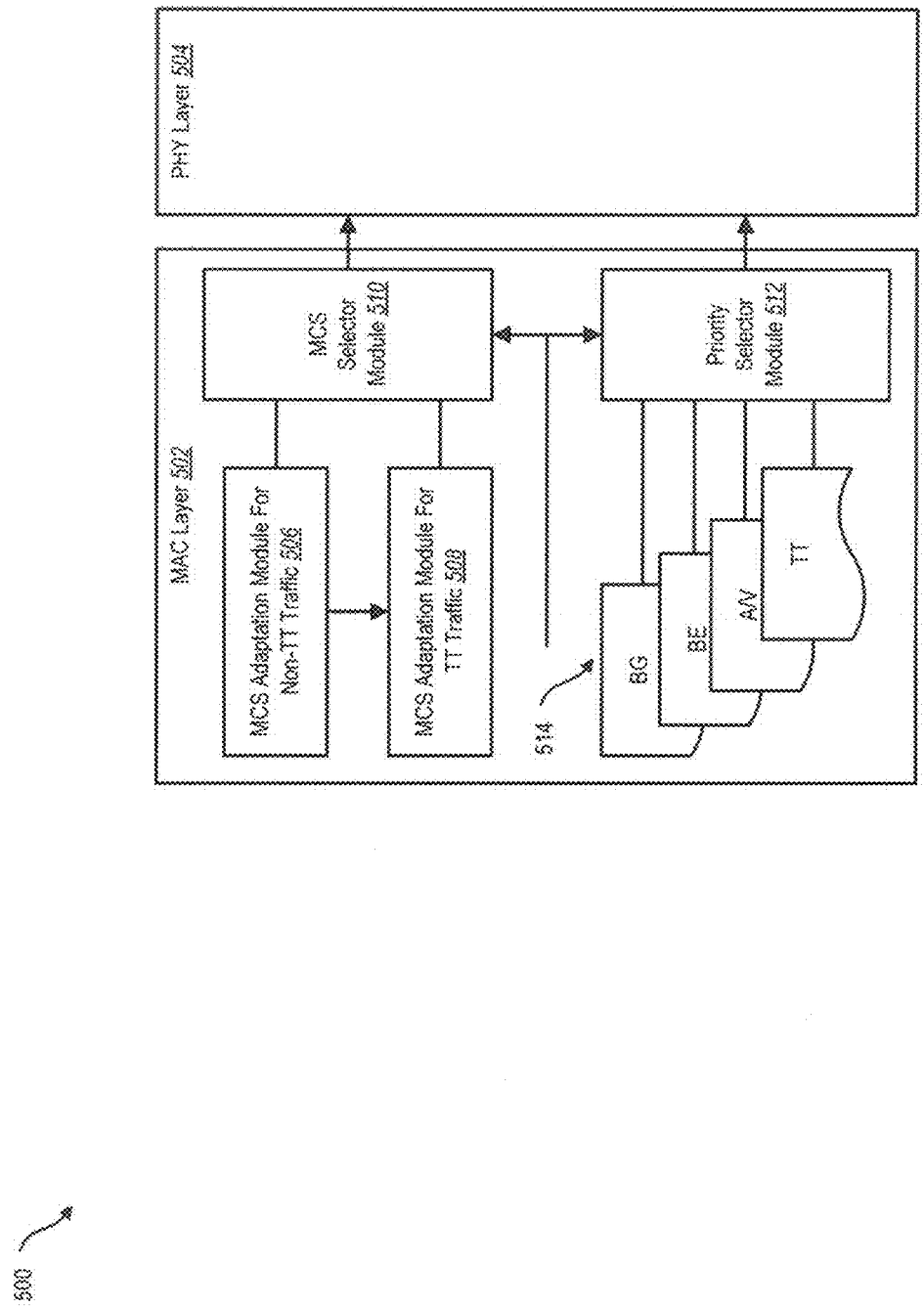
FIG. 5 illustrates an exemplary electronic device.

FIG. 5 illustrates an exemplary electronic device 500, in accordance with at least one aspect described in the present disclosure. The electronic device 500 may correspond to the CUC device 102, the CNC device 104, the CCD 101, the talker end devices 106, or the listener end devices 108 in the TSN 100 of FIG. 1. The electronic device 500 may include a memory (not illustrated), one or more processors (not illustrated), or some combination thereof.

The electronic device 500 may include a MAC layer 502 and a PHY layer 504. The MAC layer 502 may include a MCS adaptation module for non-TT traffic 506, a MCS adaptation module for TT traffic 508, a MCS selector module 510, a priority selector module 512 (e.g., a next traffic selector), and traffic queues 514. The MCS selector module 510 and the priority selector module 512 may each include a memory (not illustrated), one or more processors (not illustrated), or some combination thereof.

The MCS adaptation module for non-TT traffic 506 may be communicatively coupled to the MCS selector module 510 and the MCS adaptation module for TT traffic 508. The MCS adaptation module for TT traffic 508 may be communicatively coupled to the MCS selector module 510. The MCS selector module 510 may be communicatively coupled to the PHY layer 504. The priority selector module 512 may be communicatively coupled to the PHY layer 504 and the traffic queues 514. In some aspects, the traffic queues 514 may include audio/video (A/V) traffic, best effort (BE) traffic, background (BG) traffic, TT traffic, or some combination thereof.

The MCS selector module 510 may determine a current MCS for the non-TT traffic. The MCS selector module 510 may receive the current MCS for the non-TT traffic from the MCS adaptation module for non-TT traffic 506. In some aspects, the MCS selector module 510 may determine a current traffic type for the communication link. In other aspects, the priority selector module 512 may determine the current traffic type for the communication link.

Responsive to the current traffic type being TT traffic, the MCS selector module 510 may instruct the MCS adaptation module for TT traffic 508 to select a MCS that increases reliability of transmission of the TT traffic compared to the non-TT traffic. The MCS adaptation module for TT traffic 508 may receive the current MCS for the non-TT traffic from the MCS adaptation module for non-TT traffic 506. The MCS adaptation module for TT traffic 508 may select a MCS that is different than the current MCS for the non-TT traffic. The MCS selector module 510 may receive the selected MCS from the MCS adaptation module for TT traffic 508.

The MCS selector module 510 may provide the selected MCS to the priority selector module 512. The priority selector module 512 may modulate the TT traffic according to the selected MCS. In addition, the priority selector module 512 may control a rate of change between MCSs for the TT traffic and the non-TT traffic.

Figure 6:
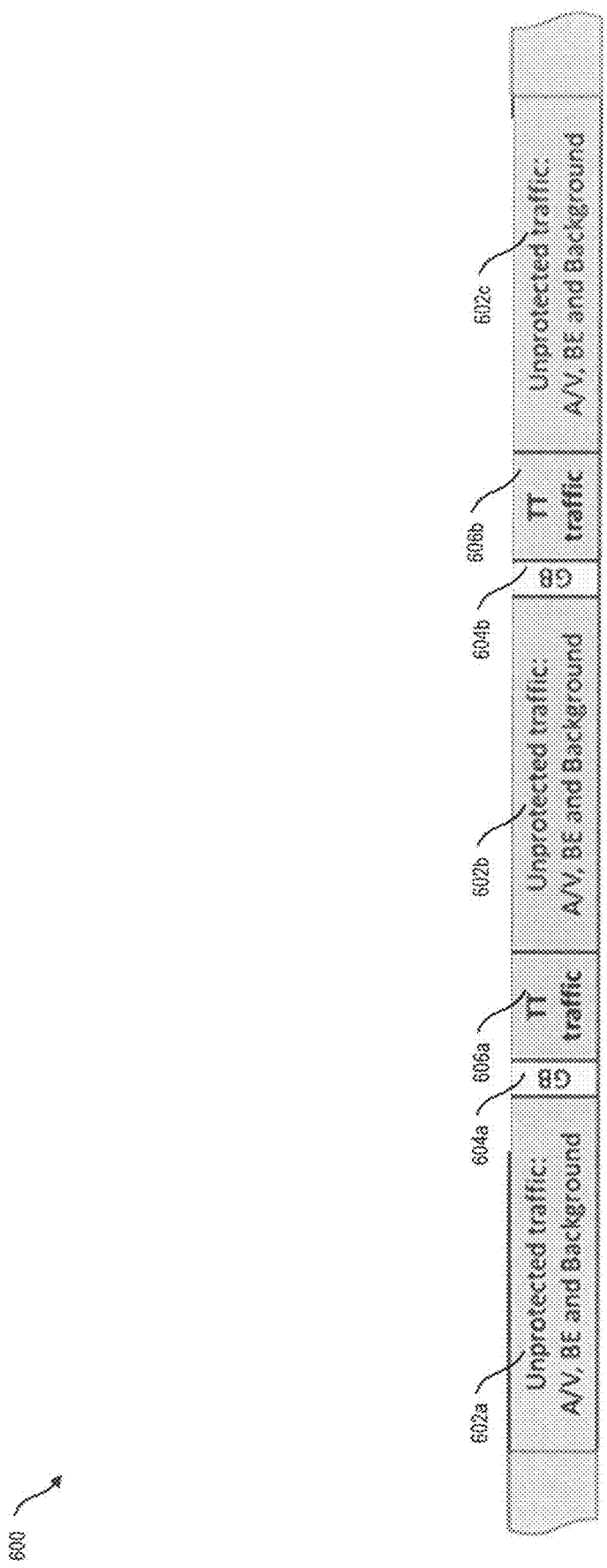
FIG. 6 illustrates another exemplary traffic sequence for communication within the TSN of FIG. 1.

FIG. 6 illustrates another exemplary traffic sequence 600 for communication within the TSN 100 of FIG. 1, in accordance with at least one aspect described in the present disclosure. The traffic sequence 600 may include unprotected traffic 602a-c, GBs 604a-b, and TT traffic 606a-b. The traffic sequence 600 may be separated into periods of time for TT traffic (e.g., the TT traffic 606a-b) and periods of time for non-TT traffic (e.g., the unprotected traffic 602a-c and the GBs 604a-b).

In some aspects, the unprotected traffic 602a-c may be optimized by the electronic device 500, the CUC device 102, the CNC device 104, the CCD 101, or some combination thereof. For example, the unprotected traffic 602a-c may be optimized for increased throughput of the communication link. As another example, the TT traffic 606a-b may be optimized to ensure successful TT traffic delivery and to increase efficiency of the communication link.

Figure 7:
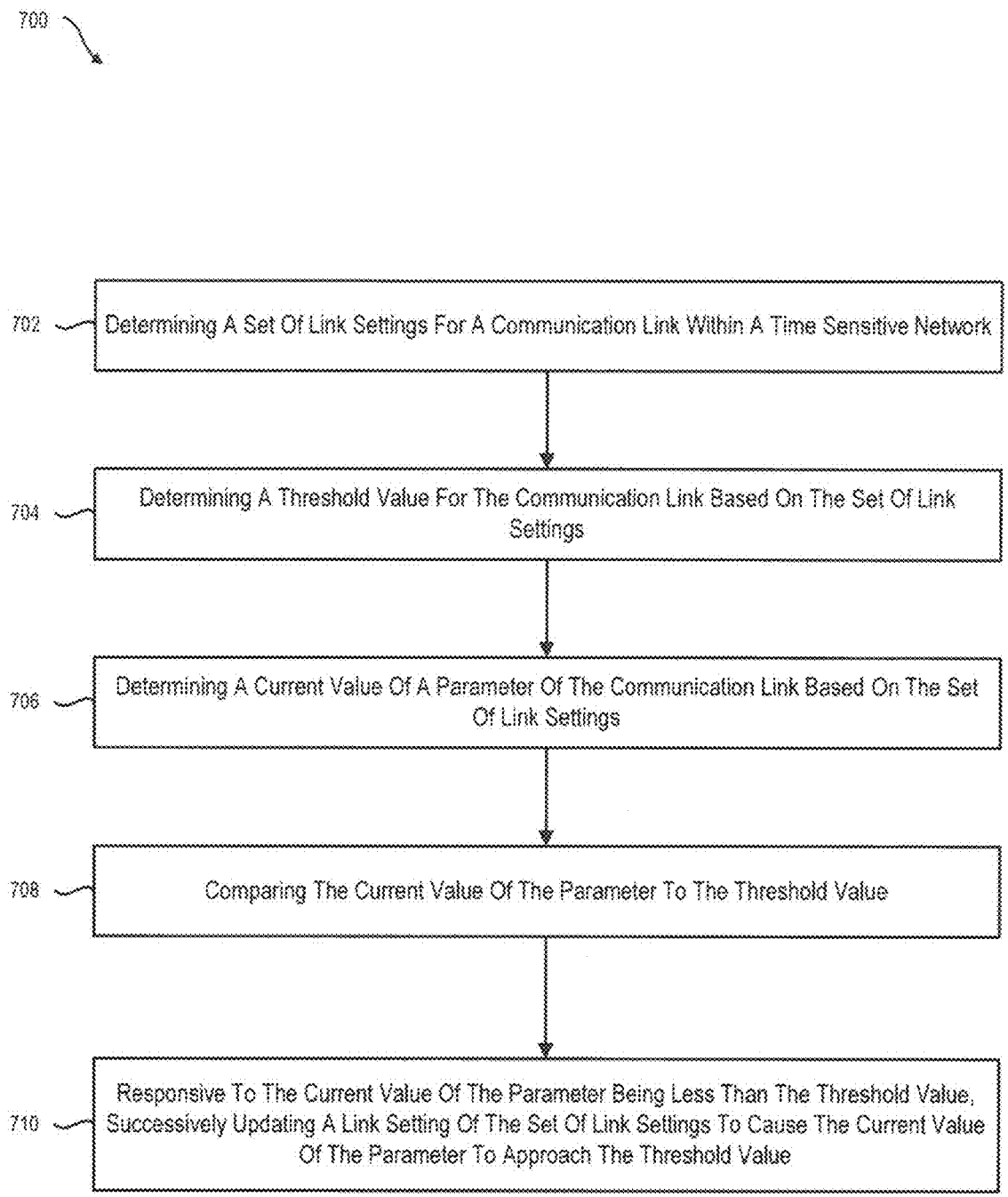
FIG. 7 illustrates an exemplary flowchart of a method to successively update settings within the TSN of FIG. 1.

FIG. 7 illustrates an exemplary flowchart of a method 700 to successively update settings within the TSN 100 of FIG. 1, in accordance with at least one aspect described in the present disclosure. The method 700 may include determining a set of link settings for a communication link within a TSN 702; determining a threshold value for the communication link based on the set of link settings 704; determining a current value of a parameter of the communication link based on the set of link settings 706; compare the current value of the parameter to the threshold value 708; and responsive to the current value of the parameter being less than the corresponding threshold value of the threshold value, successively updating a link setting of the set of link settings to cause the current value of the parameter to approach the threshold value 710.

Figure 8:
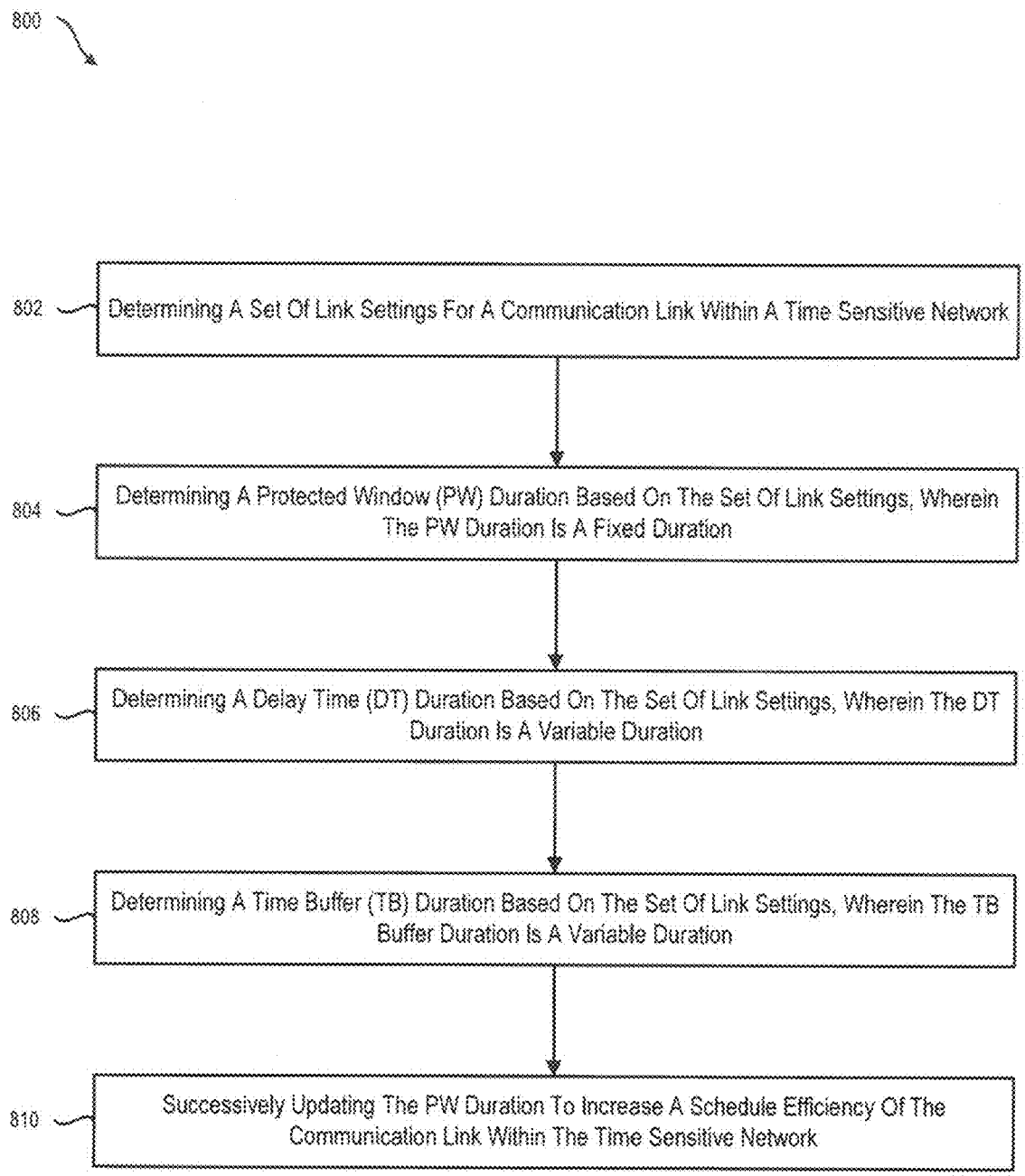
FIG. 8 illustrates an exemplary flowchart of a method to successively update a PW duration within the TSN of FIG. 1.

FIG. 8 illustrates an example flowchart of a method to successively update a PW duration within the TSN 100 of FIG. 1, in accordance with at least one aspect described in the present disclosure. The method 800 may include determining a set of link settings for a communication link within a time sensitive network 802; determining a PW duration based on the set of link settings, wherein the PW duration is a fixed duration 804; determining a DT duration based on the set of link settings, wherein the DT duration is a variable duration 806; determining a TB duration based on the set of link settings, wherein the TB buffer duration is a variable duration 808; and successively updating the PW duration to increase a schedule efficiency of the communication link within the time sensitive network 810.

Figure 9:
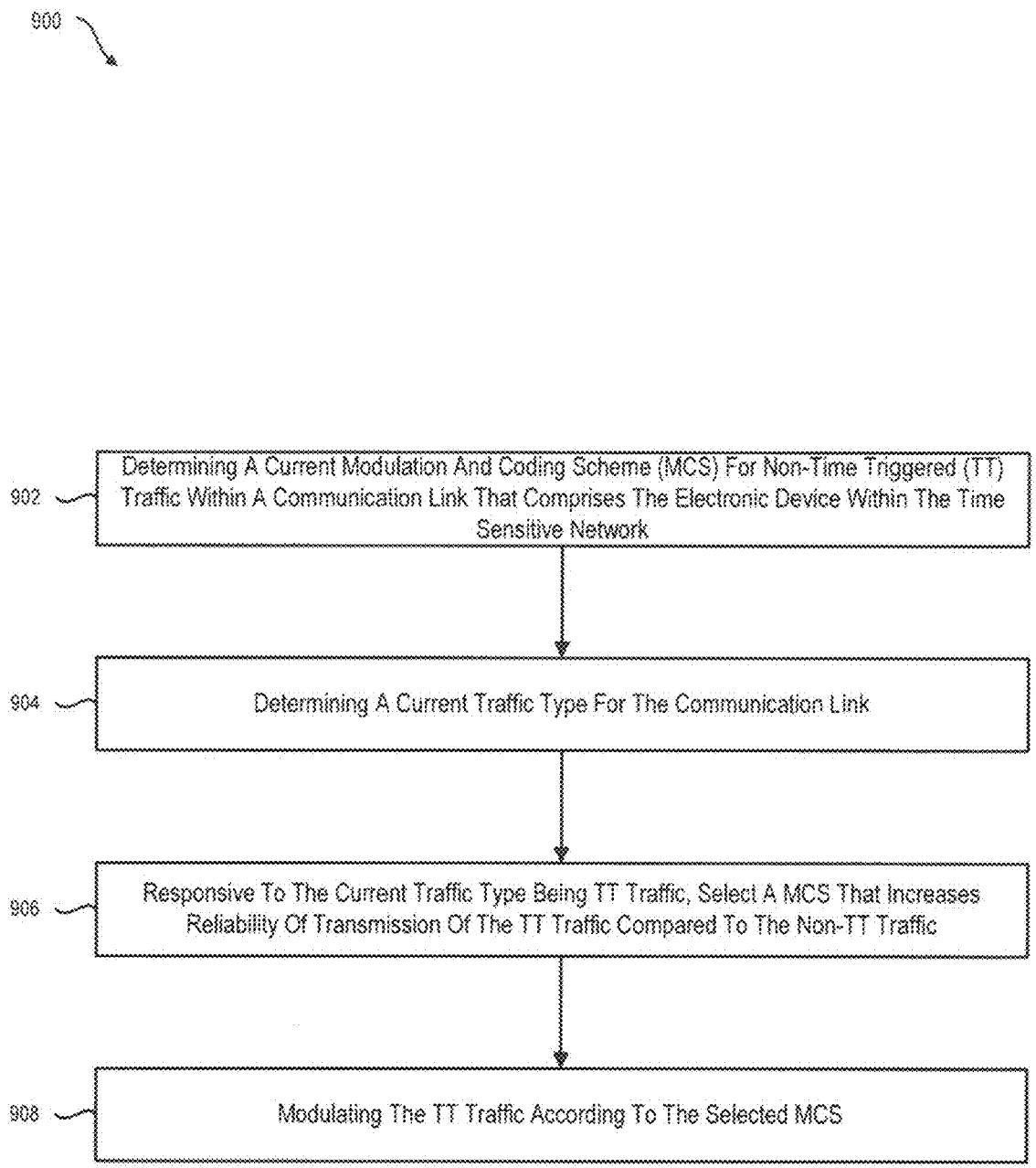
FIG. 9 illustrates an exemplary flowchart of a method to update modulation settings based on traffic type within the TSN of FIG. 1, all according to at least one aspect described in the present disclosure.

FIG. 9 illustrates an example flowchart of a method to update modulation settings based on traffic type within the TSN 100 of FIG. 1, in accordance with at least one aspect described in the present disclosure. The method 900 may include determining a current MCS for non-TT traffic within a communication link that includes the electronic device within the time sensitive network 902; determining a current traffic type for the communication link 904; responsive to the current traffic type being TT traffic, select a MCS that increases reliability of transmission of the TT traffic compared to the non-TT traffic 906; and modulating the TT traffic according to the selected MCS 908.

A CCD may include a memory and one or more processors. The memory may include computer-readable instructions stored thereon. The one or more processors may be operatively coupled to the memory. The one or more processors may read and execute the computer-readable instructions to perform or control performance of operations of the CCD. The CCD may determine link settings for a communication link within a TSN. The link settings may include a periodicity, a maximum PW size, a minimum PW size, a maximum GB size, a maximum GB size, a current MCS, a DT, or some combination thereof.

The PW may occur to permit TT traffic (e.g., time critical traffic) to be transmitted without non-TT traffic potentially causing interference on the communication link. The PW may include a bounded latency for the TT traffic. The GB may precede the PW and may be configured to ensure previous transmissions are completed prior to the PW starting. The DT may include a period of time for an initial channel access delay time prior to time critical traffic being transmitted.

In some aspects, the CCD may select a GB duration based on characteristics of the non-TT traffic. The characteristics of the non-TT traffic may include a maximum size of data packets.

The CCD may determine threshold values for the communication link based on the link settings. In addition, the CCD may determine a current value of one or more parameters of the communication link based on the link settings. The parameters may include a TB duration, a PW efficiency, and a GB efficiency.

The PW efficiency may be determined according to Equation 4.

$$\max\{1-(DT+TB)/PW\} \qquad \text{Equation 4}$$

In Equation 4, DT represents a DT duration, TB represents a TB duration, and PW represents a PW duration.

The GB efficiency may be determined according to Equation 5.

$$\min\{GB \ \& \ DT\} \qquad \text{Equation 5}$$

In Equation 5, GB represents a GB duration and DT represent the DT duration.

The CCD may compare the current values of the parameters to corresponding threshold values. The threshold values may include a pre-defined reliability threshold value, a pre-defined PW efficiency threshold value, a pre-defined GB efficiency threshold value, or some combination thereof.

Responsive to one or more of the current values being less than the corresponding threshold value, the CCD may successively update one or more link settings. The CCD may update the one or more link settings to cause one or more of the current values to approach the corresponding threshold value.

In some aspects, the current value may include the TB duration and the corresponding threshold value may include the pre-defined reliability threshold value. The CCD may compare the TB duration to the pre-defined reliability threshold value. Responsive to the TB duration being less than the pre-defined reliability threshold value, the CCD may determine a current TB value according to Equation 6.

$$PW-(DT+TB) \qquad \text{Equation 6}$$

In Equation 6, DT represents the DT duration, TB represents the TB duration, and PW represents the PW duration. The CCD may compare the current TB value to a previous TB value. Responsive to the current TB value being greater than the previous TB value, the CCD may increase the PW duration by a pre-defined PW step size.

In some aspects, responsive to the TB duration being less than the pre-defined reliability threshold value, the CCD may determine a current a DT duration. The CCD may compare the current DT duration to a previous DT duration. Responsive to the current DT duration being greater than the previous DT duration, the CCD may increase the GB duration by a pre-defined GB step size. Further, the CCD may update the GB efficiency threshold value.

In some aspects, the current value may include the PW efficiency and the corresponding threshold value may include the pre-defined PW efficiency threshold value. The CCD may determine the PW efficiency according to Equation 4. The CCD may compare the PW efficiency to the pre-defined PW efficiency threshold value.

Responsive to the PW efficiency being less than the pre-defined PW threshold value, the CCD may increase the PW duration by a pre-defined PW step size. In some aspects, the PW step size may be configurable. In these and other aspects, the PW step size may be based on user input, pre-defined settings, the link settings, or some combination thereof.

In some aspects, the current value may include the GB efficiency and the corresponding threshold value may include the pre-defined GB efficiency threshold value. The CCD may determine the GB efficiency according to Equation 5. The CCD may compare the GB efficiency to the pre-defined GB efficiency threshold value. Responsive to the GB efficiency being less than the pre-defined GB threshold value, the CCD may reduce the GB duration by a pre-defined GB step size.

The CCD may determine the link settings for the communication link within the TSN. The CCD may determine the PW duration based on the link settings. The PW duration may include a fixed duration for a short period of time. In some aspects, the PW duration may include the fixed duration to optimize an average efficiency of the communication link over the DT and the TB. The CCD may determine a DT duration based on the link settings. In some aspects, the DT duration may include a variable duration. The DT duration may include a variable duration due to fluctuations in the channel quality of the communication link.

The CCD may determine a TB duration based on the link settings. The TB duration may include a variable duration. The TB duration may include a variable duration due to fluctuations in the channel quality of the communication link.

The CCD may successively update the PW duration to increase a schedule efficiency of the communication link. The CCD may determine the schedule efficiency according to Equation 7.

$$1-(GB+DT+TB)/PW \quad \text{Equation 7}$$

In Equation 7, GB represents the GB duration, DT represents the DT duration, TB represents the TB duration, and PW represents the PW duration.

The CCD may successively update the PW duration according to Equation 8.

$$\max_{PW} E[1-(DT+TB)/PW] \quad \text{Equation 8}$$

In Equation 8, DT represents the DT duration, TB represents the TB duration, PW represents the PW duration, and E[ ] represents the expectation operator.

The CCD may successively update the PW duration according to Equation 9.

$$P[TB \geq 0] \geq 1-\delta \text{ and } PW \leq PW_{max} \quad \text{Equation 9}$$

In Equation 9, $PW_{max}$ represents a maximum PW duration, $\delta$ represents a maximum probability that the TB duration is greater than zero, and P[ ] represents the probability density function.

The CCD may increase an expected value of the efficiency of the communication link over the durations of the DT and the TB. The CCD may determine distributions of the DT and the TB based on previous link settings and values.

In some aspects, the CCD may apply a stochastic primal-dual algorithm by applying dual parameters D1 and D2. The CCD may update the PW duration successively according to a Lagrangian function defined according to Equation 10.

$$E[1-(DT+TB)/PW]+D1*(P[TB \geq 0]-1+\delta)+D2* (PW_{max}-PW) \quad \text{Equation 10}$$

In Equation 10, DT represents the DT duration, TB represents the TB duration, PW represents the PW duration, D1 represents a first dual parameter, D2 represents a second dual parameter, $PW_{max}$ represents a maximum PW duration, $\delta$ represents a maximum probability that the TB duration is greater than zero, E[ ] represents the expectation operator, and P[ ] represents the probability density function.

The first dual parameter and the second dual parameter may initially be set to be 0.

The CCD may determine an optimal duration of the PW and the dual parameters D1 and D2 according to the Equation 11.

$$\min_{D1,D2} \max_{PW} L(PW, D1, D2) \quad \text{Equation 11}$$

In Equation 11, a minimum of the Lagrangian function is equal to D1 or D2 and a maximum of the Lagrangian function is equal to the PW duration.

In some aspects, the CCD may update the PW duration according to a stochastic gradient according to Equation 12.

$$PW+\varepsilon[GRAD\{E[1-(DT+TB)/PW]\}-D2] \quad \text{Equation 12}$$

In Equation 12, PW represents a current PW duration, DT represents a current DT duration, and TB represents a current TB duration.

In some aspects, the CCD may successively update the PW duration, the first dual parameter, the second dual parameter, or some combination thereof until there is a convergence. The CCD may update the first dual parameter according to a stochastic gradient according to Equation 13.

$$D1-\varepsilon[P[TB \geq 0]-1+\delta] \quad \text{Equation 13}$$

In Equation 13, D1 represents a current value for the first dual parameter, TB represents a current TB duration, and $\delta$ represents the maximum probability that the TB duration is greater than zero.

The CCD may update the second dual parameter according to a stochastic gradient according to Equation 14.

$$D2-\varepsilon[PW_{max}-PW] \quad \text{Equation 14}$$

In Equation 14, D2 represents a current value for the second dual parameter, PW represents a current PW duration, and $PW_{max}$ represents a maximum PW duration.

The CCD may update the PW duration and the first dual parameter and the second dual parameter according to Equations 12-14 successively using a machine learning algorithm approximation.

In some aspects, application settings for the TT traffic may vary from the non-TT traffic. For example, application settings for the TT traffic may include ultra-high reliability and bounded latency and the application settings for the non-TT traffic may include maximum throughput. Thus, one or more link settings, parameters of the communication link, or some combination thereof may be different for the TT traffic versus the non-TT traffic.

An electronic device within a TSN may include a memory and one or more processors. The memory may include computer-readable instructions stored thereon. The one or more processors may be operatively coupled to the memory. The one or more processors may read and execute the computer-readable instructions to perform or control performance of operations of the electronic device.

The electronic device may determine a current MCS for the non-TT traffic within a communication link that includes the electronic device. In some aspects, the non-TT traffic may include A/V traffic, BE traffic, BG traffic, or some combination thereof. The electronic device may determine a current traffic type for the communication link. Responsive to the current traffic type being TT traffic, the electronic device may select a MCS that increases reliability of transmission of the TT traffic compared to the non-TT traffic.

In some aspects, the selected MCS may be one level lower than the MCS for the non-TT traffic relative to reliability. In these and other aspects, the selected MCS may include a lower throughput than the MCS for the non-TT traffic. The electronic device may modulate the TT traffic according to the selected MCS. In other aspects, the selected MCS may be two or more levels lower than the MCS for the non-TT traffic relative to reliability.

In some aspects, the electronic device may select the different MCS even with one or more channel conditions for the communication link being substantially similar during transmission of the TT traffic and the non-TT traffic.

The electronic device may control a rate of change between MCSs for the TT traffic and the non-TT traffic. The electronic device may control the rate of change due to changes in the MCS potentially impacting an ability to update a centralized network schedule of the TSN and to adapt the PW duration for a duration of the TT traffic according to the selected MCS.

The electronic device may include a MCS selector module and a next data selector module (e.g., a priority selector module). In some aspects, the MCS selector module may be synchronized with the next data selector module. In these and other aspects, the MCS selector module and the next data selector module may be controlled based on the Qvb schedule timing. The MCS selector module may include memory having computer-readable instructions stored thereon. The MCS selector module may include one or more processors operatively coupled to the memory. The one or more processors may read and execute the computer-readable instructions to perform or control performance of the MCS selector module. The next data selector module may include one or more processors operatively coupled to the memory. The one or more processors may read and execute the computer-readable instructions to perform or control performance of the next data selector module.

The MCS selector module may determine the current MCS for the non-TT traffic within the communication link. The MCS selector module may select the MCS that increases reliability of transmission of the TT traffic compared to the non-TT traffic. The next data selector module may determine the current traffic type for the communication link.

In some aspects, the MCS selector module may use output from a MCS adaptation algorithm (e.g., a MCS adaptation module for non-TT traffic) to transmit the non-TT traffic. In these and other aspects, the MCS selector module may use output from an alternative MCS adaptation algorithm (e.g., a MCS adaptation module for TT traffic) configured for TT traffic requirements. The MCS adaptation module for non-TT traffic and the MCS adaptation module for TT traffic may operate based on the same or similar channel conditions.

In the following, various aspects of the present disclosure will be illustrated:

Example 1 may include a CCD that includes a memory having computer-readable instructions stored thereon. The CCD may include one or more processors operatively coupled to the memory and configured to read and execute the computer-readable instructions to perform or control performance of operations including: determine a plurality of link settings for a communication link within a time sensitive network; determine one or more threshold values for the communication link based on the plurality of link settings; determine a current value of one or more parameters of the communication link based on the plurality of link settings; compare the current value of the one or more parameters to a corresponding threshold value of the one or more threshold values; and responsive to the current value of the one or more parameters being less than the corresponding threshold value of the one or more threshold values, successively update one or more link settings of the plurality of link settings to cause the current value of the one or more parameters to approach the corresponding threshold value of the one or more threshold values.

Example 2 may include the CCD of example 1, wherein the one or more parameters of the communication link include at least one of a TB duration, a PW efficiency, and a GB efficiency.

Example 3 may include the CCD of any of examples 1 and 2, wherein the corresponding threshold value includes a pre-defined reliability threshold value, the current value of the one or more parameters includes the TB duration, and responsive to the TB duration being less than the pre-defined reliability threshold value, the operation successively update one or more link settings of the plurality of link settings includes: determine a current TB value according to PW−(DT+TB), wherein DT represents a DT duration, TB represents the TB duration, and PW represents a PW duration; compare the current TB value to a previous TB value; and responsive to the current TB value being greater than the previous TB value, increase the PW duration by a pre-defined PW step size.

Example 4 may include the CCD of any of examples 1-3, wherein the corresponding threshold value includes a pre-defined reliability threshold, the current value of the one or more parameters includes the TB duration, and responsive to the TB duration being less than the pre-defined reliability threshold, the operation successively update one or more link settings of the plurality of link settings includes: determine a current a DT duration; compare the current DT duration to a previous DT duration; responsive to the current DT duration being greater than the previous DT duration, increase a GB duration by a pre-defined GB step size; and update a GB efficiency threshold value.

Example 5 may include the CCD of any of examples 1-4, wherein the corresponding threshold value includes a pre-defined PW efficiency threshold value, the current value of the one or more parameters includes a PW efficiency determined according to:

$$\max\{1-(DT+TB)/PW\}$$

wherein DT represents a delay time duration, TB represents the TB duration, and PW represents a PW duration and responsive to the PW efficiency being less than the pre-defined PW threshold value, the operation successively update one or more link settings of the plurality of link settings includes decrease the PW duration by a pre-defined PW step size.

Example 6 may include the CCD of any of examples 1-5, wherein the corresponding threshold value includes a pre-defined GB efficiency threshold value, the current value of the one or more parameters includes a GB efficiency determined according to:

$$\min\{GB \& DT\}$$

wherein GB represents a GB duration and DT represent a delay time duration and responsive to the GB efficiency being less than the pre-defined GB threshold value, the operation successively update one or more link settings of the plurality of link settings includes reduce the GB duration by a pre-defined GB step size.

Example 7 may include the CCD of any of examples 1-6, wherein the plurality of link settings includes a periodicity, a maximum PW size, a minimum PW size, a maximum GB size, a maximum GB size, and a current MCS.

Example 8 may include the CCD of any of examples 2-7, wherein the PW is configured to permit time critical traffic to be transmitted without other traffic potentially causing interference on the communication link.

Example 9 may include the CCD of any of examples 2-8, wherein the PW includes a bounded latency for the time critical traffic.

Example 10 may include the CCD of any of examples 2-9, wherein a GB precedes the PW and is configured to ensure previous transmissions are completed prior to the PW starting.

Example 11 may include the CCD of any of examples 2-10, wherein a DT includes an initial channel access delay time prior to time critical traffic being transmitted.

Example 12 may include a method that includes: determining a plurality of link settings for a communication link within a time sensitive network; determining one or more threshold values for the communication link based on the plurality of link settings; determining a current value of one or more parameters of the communication link based on the plurality of link settings; comparing the current value of the one or more parameters to a corresponding threshold value of the one or more threshold values; and responsive to the current value of the one or more parameters being less than the corresponding threshold value of the one or more threshold values, successively updating one or more link settings of the plurality of link settings to cause the current value of the one or more parameters to approach the corresponding threshold value of the one or more threshold values.

Example 13 may include the method of example 12, wherein the corresponding threshold value includes a pre-defined reliability threshold value, the current value of the one or more parameters includes the TB duration, and responsive to the TB duration being less than the pre-defined reliability threshold value, successively updating one or more link settings of the plurality of link settings includes: determining a current TB value according to PW−(DT+TB), wherein DT represents a DT duration, TB represents the TB duration, and PW represents a PW duration; comparing the current TB value to a previous TB value; and responsive to the current TB value being greater than the previous TB value, the method includes increasing the PW duration by a pre-defined PW step size.

Example 14 may include the method of any of examples 12-13, wherein the corresponding threshold value includes a pre-defined reliability threshold, the current value of the one or more parameters includes the TB duration, and responsive to the TB duration being less than the pre-defined reliability threshold, successively updating one or more link settings of the plurality of link settings includes: determining a current a DT duration; comparing the current DT duration to a previous DT duration; responsive to the current DT duration being greater than the previous DT duration, the method includes increasing a GB duration by a pre-defined GB step size; and updating a GB efficiency threshold value.

Example 15 may include the method of any of examples 12-14, wherein the corresponding threshold value includes a pre-defined PW efficiency threshold value, the current value of the one or more parameters includes a PW efficiency determined according to:

$$\max\{1-(DT+TB)/PW\}$$

wherein DT represents a delay time duration, TB represents the TB duration, and PW represents a PW duration and responsive to the PW efficiency being less than the pre-defined PW threshold value, successively updating one or more link settings of the plurality of link settings includes decreasing the PW duration by a pre-defined PW step size.

Example 16 may include the method of any of examples 12-15, wherein the corresponding threshold value includes a pre-defined GB efficiency threshold value, the current value of the one or more parameters includes a GB efficiency determined according to:

$$\min\{GB \& DT\}$$

wherein GB represents a GB duration and DT represent a delay time duration and responsive to the GB efficiency being less than the pre-defined GB threshold value, successively updating one or more link settings of the plurality of link settings includes reducing the GB duration by a pre-defined GB step size.

Example 17 may include a non-transitory computer-readable medium having computer-readable instructions stored thereon that are executable by a processor to perform or control performance of operations including: determining a plurality of link settings for a communication link within a time sensitive network; determining one or more threshold values for the communication link based on the plurality of link settings; determining a current value of one or more parameters of the communication link based on the plurality of link settings; comparing the current value of the one or more parameters to a corresponding threshold value of the one or more threshold values; and responsive to the current value of the one or more parameters being less than the corresponding threshold value of the one or more threshold values, successively updating one or more link settings of the plurality of link settings to cause the current value of the one or more parameters to approach the corresponding threshold value of the one or more threshold values.

Example 18 may include the non-transitory computer-readable medium of example 17, wherein the corresponding threshold value includes a pre-defined reliability threshold value, the current value of the one or more parameters includes the TB duration, and responsive to the TB duration being less than the pre-defined reliability threshold value, the operation successively updating one or more link settings of the plurality of link settings includes: determining a current TB value according to PW−(DT+TB), wherein DT represents a DT duration, TB represents the TB duration, and PW represents a PW duration; compare the current TB value to a previous TB value; and responsive to the current TB value being greater than the previous TB value, the operations include increasing the PW duration by a pre-defined PW step size.

Example 19 may include the non-transitory computer-readable medium of any of examples 17-18, wherein the corresponding threshold value includes a pre-defined reliability threshold, the current value of the one or more parameters includes the TB duration, and responsive to the TB duration being less than the pre-defined reliability threshold, the operation successively updating one or more link settings of the plurality of link settings includes: determining a current a DT duration; comparing the current DT duration to a previous DT duration; responsive to the current DT duration being greater than the previous DT duration, the operations include increasing a GB duration by a pre-defined GB step size; and updating a GB efficiency threshold value.

Example 20 may include the non-transitory computer-readable medium of any of examples 17-19, wherein the corresponding threshold value includes a pre-defined PW efficiency threshold value, the current value of the one or more parameters includes a PW efficiency determined according to:

$$\max\{1-(DT+TB)/PW\}$$

wherein DT represents a delay time duration, TB represents the TB duration, and PW represents a PW duration and responsive to the PW efficiency being less than the pre-defined PW threshold value, the operation successively updating one or more link settings of the plurality of link settings includes decreasing the PW duration by a pre-defined PW step size.

Example 21 may include the non-transitory computer-readable medium of any of examples 17-20, wherein the corresponding threshold value includes a pre-defined GB efficiency threshold value, the current value of the one or more parameters includes a GB efficiency determined according to:

$$\min\{GB \ \& \ DT\}$$

wherein GB represents a GB duration and DT represent a delay time duration and responsive to the GB efficiency being less than the pre-defined GB threshold value, the operation successively updating one or more link settings of the plurality of link settings includes reducing the GB duration by a pre-defined GB step size.

Example 22 may include a CCD that includes a memory having computer-readable instructions stored thereon; and one or more processors operatively coupled to the memory and configured to read and execute the computer-readable instructions to perform or control performance of operations including: determine a plurality of link settings for a communication link within a time sensitive network; determine a PW duration based on the plurality of link settings, wherein the PW duration is a fixed duration; determine a DT duration based on the plurality of link settings, wherein the DT duration is a variable duration; determine a TB duration based on the plurality of link settings, wherein the TB buffer duration is a variable duration; and successively update the PW duration to increase a schedule efficiency of the communication link within the time sensitive network.

Example 23 may include the CCD of example 22, wherein the PW duration is successively updated according to:

$$\max_{PW} E[1-(DT+TB)/PW]$$

wherein DT represents the DT duration, TB represents the TB duration, PW represents the PW duration, and E[ ] represents the expectation operator.

Example 24 may include the CCD of example 23, wherein the PW duration is successively updated according to:

$$P[TB \geq 0] \geq 1-\delta \text{ and } PW \leq PW_{max}$$

wherein $PW_{max}$ represents a maximum PW duration, $\delta$ represents a maximum probability that the TB duration is greater than zero, and P[ ] represents the probability density function.

Example 25 may include the CCD of example 22, wherein the PW duration is successively updated according to a Lagrangian function defined according to:

$$E[1-(DT+TB)/PW]+D1*(P[TB \geq 0]-1+\delta)+D2*(PW_{max}-PW)$$

wherein DT represents the DT duration, TB represents the TB duration, PW represents the PW duration, D1 represents a first dual parameter, D2 represents a second dual parameter, $PW_{max}$ represents a maximum PW duration, $\delta$ represents a maximum probability that the TB duration is greater than zero, E[ ] represents the expectation operator, and P[ ] represents the probability density function.

Example 26 may include the CCD of example 25, wherein a minimum of the Lagrangian function is equal to D1 or D2 and a maximum of the Lagrangian function is equal to the PW duration.

Example 27 may include the CCD of any of examples 25 and 26, wherein the PW duration is updated according to a stochastic gradient according to:

$$PW+\varepsilon[GRAD\{E[1-(DT+TB)/PW]\}-D2]$$

wherein PW represents a current PW duration, DT represents a current DT duration, and TB represents a current TB duration.

Example 28 may include the CCD of any of examples 25-27, wherein the first dual parameter is updated according to a stochastic gradient according to:

$$D1-\varepsilon[P[TB \geq 0]-1+\delta]$$

wherein D1 represents a current value for the first dual parameter, TB represents a current TB duration, and $\delta$ represents a maximum probability that the TB duration is greater than zero.

Example 29 may include the CCD of any of examples 25-28, wherein the second dual parameter is updated according to a stochastic gradient according to:

$$D2-\varepsilon[PW_{max}-PW]$$

wherein D2 represents a current value for the second dual parameter, PW represents a current PW duration, and $PW_{max}$ represents a maximum PW duration.

Example 30 may include the CCD of any of examples 22-29, wherein the PW duration is successively updated using a machine learning algorithm.

Example 31 may include a method including: determining a plurality of link settings for a communication link within a time sensitive network; determining a PW duration based on the plurality of link settings, wherein the PW duration is a fixed duration; determining a DT duration based on the plurality of link settings, wherein the DT duration is a variable duration; determining a TB duration based on the plurality of link settings, wherein the TB buffer duration is a variable duration; and successively updating the PW duration to increase a schedule efficiency of the communication link within the time sensitive network.

Example 32 may include the method of example 31 wherein the PW duration is successively updated according to:

$$\max_{PW} E[1-(DT+TB)/PW]$$

wherein DT represents the DT duration, TB represents the TB duration, PW represents the PW duration, and E[ ] represents the expectation operator.

Example 33 may include the method of example 32, wherein the PW duration is successively updated according to:

$$P[TB\geq 0]\geq 1-\delta \text{ and } PW\leq PW_{max}$$

wherein $PW_{max}$ represents a maximum PW duration, $\delta$ represents a maximum probability that the TB duration is greater than zero, and P[ ] represents the probability density function.

Example 34 may include the method of example 31, wherein the PW duration is successively updated according to a Lagrangian function defined according to:

$$E[1-(DT+TB)/PW]+D1*(P[TB\geq 0]-1+\delta)+D2*(PW_{max}-PW)$$

wherein DT represents the DT duration, TB represents the TB duration, PW represents the PW duration, D1 represents a first dual parameter, D2 represents a second dual parameter, $PW_{max}$ represents a maximum PW duration, $\delta$ represents a maximum probability that the TB duration is greater than zero, E[ ] represents the expectation operator, and P[ ] represents the probability density function.

Example 35 may include the method of example 34, wherein the PW duration is updated according to a stochastic gradient according to:

$$PW+\varepsilon[GRAD\{E[1-(DT+TB)/PW]\}-D2]$$

wherein PW represents a current PW duration, DT represents a current DT duration, and TB represents a current TB duration.

Example 36 may include the method of any of examples 34-35, wherein the first dual parameter is updated according to a stochastic gradient according to:

$$D1-\varepsilon[P[TB\geq 0]-1+\delta]$$

wherein D1 represents a current value for the first dual parameter, TB represents a current TB duration, and $\delta$ represents a maximum probability that the TB duration is greater than zero.

Example 37 may include the method of any of examples 35-36, wherein the second dual parameter is updated according to a stochastic gradient according to:

$$D2-\varepsilon[PW_{max}-PW]$$

wherein D2 represents a current value for the second dual parameter, PW represents a current PW duration, and $PW_{max}$ represents a maximum PW duration.

Example 38 may include a non-transitory computer-readable medium having computer-readable instructions stored thereon that are executable by a processor to perform or control performance of operations including: determining a plurality of link settings for a communication link within a time sensitive network; determining a PW duration based on the plurality of link settings, wherein the PW duration is a fixed duration; determining a DT duration based on the plurality of link settings, wherein the DT duration is a variable duration; determining a TB duration based on the plurality of link settings, wherein the TB buffer duration is a variable duration; and successively updating the PW duration to increase a schedule efficiency of the communication link within the time sensitive network.

Example 39 may include the non-transitory computer-readable of example 38 wherein the PW duration is successively updated according to:

$$\max_{PW} E[1-(DT+TB)/PW]$$

wherein DT represents the DT duration, TB represents the TB duration, PW represents the PW duration, and E[ ] represents the expectation operator.

Example 40 may include the non-transitory computer-readable of example 39, wherein the PW duration is successively updated according to:

$$P[TB\geq 0]\geq 1-\delta \text{ and } PW\leq PW_{max}$$

wherein $PW_{max}$ represents a maximum PW duration, $\delta$ represents a maximum probability that the TB duration is greater than zero, and P[ ] represents the probability density function.

Example 41 may include the non-transitory computer-readable of example 38, wherein the PW duration is successively updated according to a Lagrangian function defined according to:

$$E[1-(DT+TB)/PW]+D1*(P[TB\geq 0]-1+\delta)+D2*(PW_{max}-PW)$$

wherein DT represents the DT duration, TB represents the TB duration, PW represents the PW duration, D1 represents a first dual parameter, D2 represents a second dual parameter, $PW_{max}$ represents a maximum PW duration, $\delta$ represents a maximum probability that the TB duration is greater than zero, E[ ] represents the expectation operator, and P[ ] represents the probability density function.

Example 42 may include the non-transitory computer-readable of example 41, wherein a minimum of the Lagrangian function is equal to D1 or D2 and a maximum of the Lagrangian function is equal to the PW duration.

Example 43 may include the non-transitory computer-readable of any of examples 41 and 35, wherein the PW duration is updated according to a stochastic gradient according to:

$$PW+\varepsilon[GRAD\{E[1-(DT+TB)/PW]\}-D2]$$

wherein PW represents a current PW duration, DT represents a current DT duration, and TB represents a current TB duration.

Example 44 may include the non-transitory computer-readable of any of examples 41-43, wherein the first dual parameter is updated according to a stochastic gradient according to:

$$D1-\varepsilon[P[TB\geq 0]-1+\delta]$$

wherein D1 represents a current value for the first dual parameter, TB represents a current TB duration, and $\delta$ represents a maximum probability that the TB duration is greater than zero.

Example 45 may include the non-transitory computer-readable of any of examples 41-44, wherein the second dual parameter is updated according to a stochastic gradient according to:

$$D2-\varepsilon[PW_{max}-PW]$$

wherein D2 represents a current value for the second dual parameter, PW represents a current PW duration, and $PW_{max}$ represents a maximum PW duration.

Example 46 may include an electronic device within a TSN, the electronic device may include: a memory having computer-readable instructions stored thereon; and one or more processors operatively coupled to the memory and configured to read and execute the computer-readable instructions to perform or control performance of operations may include: determine a MCS for non-TT traffic within a communication link that includes the electronic device within the time sensitive network; determine a current traffic type for the communication link; responsive to the current traffic type being TT traffic, select a MCS that increases reliability of transmission of the TT traffic compared to the non-TT traffic; and modulate the TT traffic according to the selected MCS.

Example 47 may include the electronic device of example 46, wherein the operations further include control a rate of change between MCSs for the TT traffic and the non-TT traffic.

Example 48 may include the electronic device of any of examples 46 and 47 further including: a MCS selector module including: a memory having computer-readable instructions stored thereon; and one or more processors operatively coupled to the memory and configured to read and execute the computer-readable instructions to perform or control performance of the operations: determine the current MCS for the non-TT traffic within the communication link; and select the MCS that increases reliability of transmission of the TT traffic compared to the non-TT traffic; and a next data selector module including: a memory having computer-readable instructions stored thereon; and one or more processors operatively coupled to the memory and configured to read and execute the computer-readable instructions to perform or control performance of the operation determine a current traffic type for the communication link.

Example 49 may include the electronic device of any of examples 46-48, wherein one or more channel conditions for the communication link are substantially similar during transmission of the TT traffic and the non-TT traffic.

Example 50 may include the electronic device of any of examples 46-49, wherein the non-TT traffic includes at least one of A/V traffic, BE traffic, and BG traffic.

Example 51 may include the electronic device of any of examples 46-50, wherein the selected MCS is one level lower than the MCS for the non-TT traffic relative to link reliability and includes a lower throughput than the MCS for the non-TT traffic.

Example 52 may include the electronic device of any of examples 47-51, wherein the PW is configured to permit time critical traffic to be transmitted without other traffic potentially causing interference on the communication link.

Example 53 may include the electronic device of any of examples 46-52, wherein a protected window includes a bounded latency for the time critical traffic.

Example 54 may include a method, including: determining a MCS for non-TT traffic within a communication link that includes the electronic device within the time sensitive network; determining a current traffic type for the communication link; responsive to the current traffic type being TT traffic, selecting a MCS that increases reliability of transmission of the TT traffic compared to the non-TT traffic; and modulate the TT traffic according to the selected MCS.

Example 55 may include the method of example 54 further including controlling a rate of change between MCSs for the TT traffic and the non-TT traffic.

Example 56 may include a non-transitory computer-readable medium having computer-readable instructions stored thereon that are executable by a processor to perform or control performance of operations including: determining a MCS for non-TT traffic within a communication link that includes the electronic device within the time sensitive network; determining a current traffic type for the communication link; responsive to the current traffic type being TT traffic, selecting a MCS that increases reliability of transmission of the TT traffic compared to the non-TT traffic; and modulate the TT traffic according to the selected MCS.

Example 57 may include the non-transitory computer-readable medium of example 56, wherein the operations further include controlling a rate of change between MCSs for the TT traffic and the non-TT traffic.

Example 58 may include the non-transitory computer-readable medium of any of examples 57 and 58 further including: a MCS selector module including: a memory having computer-readable instructions stored thereon; and one or more processors operatively coupled to the memory and configured to read and execute the computer-readable instructions to perform or control performance of the operations: determining the current MCS for the non-TT traffic within the communication link; and selecting the MCS that increases reliability of transmission of the TT traffic compared to the non-TT traffic; and a next data selector module including: a memory having computer-readable instructions stored thereon; and one or more processors operatively coupled to the memory and configured to read and execute the computer-readable instructions to perform or control performance of the operation determining a current traffic type for the communication link.

Example 59 may include the non-transitory computer-readable medium of any of examples 56-58, wherein one or more channel conditions for the communication link are substantially similar during transmission of the TT traffic and the non-TT traffic.

Example 60 may include the non-transitory computer-readable medium of any of examples 56-59, wherein the non-TT traffic includes at least one of A/V traffic, BE traffic, and BG traffic.

Example 61 may include the non-transitory computer-readable medium of any of examples 56-60, wherein the selected MCS is one level lower than the MCS for the non-TT traffic relative to link reliability and includes a lower throughput than the MCS for the non-TT traffic.

Example 62 may include the non-transitory computer-readable medium of any of examples 57-61, wherein the PW is configured to permit time critical traffic to be transmitted without other traffic potentially causing interference on the communication link.

Example 63 may include the non-transitory computer-readable medium of any of examples 56-62, wherein a protected window includes a bounded latency for the time critical traffic.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. An apparatus comprising:
a memory having computer-readable instructions stored thereon; and
a processor operatively coupled to the memory and configured to read and execute the computer-readable instructions to perform or control performance of operations comprising:
determine a plurality of link settings for a communication link within a time sensitive network;
determine a threshold value for a parameter of the communication link based on the plurality of link settings, wherein the parameter comprises a time buffer (TB) duration, a protected window (PW) efficiency, or a guard band (GB) efficiency, wherein the threshold value comprises a pre-defined PW efficiency threshold value;
determine a current value of the parameter of the communication link based on the plurality of link settings, wherein the current value of the parameter comprises a PW efficiency determined according to:

max{1−(DT+TB)/PW} wherein DT represents a delay time duration, TB represents the TB duration, and PW represents a PW duration and responsive to the PW efficiency being less than the pre-defined PW threshold value, wherein the operation update the link setting of the plurality of link settings comprises reduce the PW duration by a pre-defined PW step size;
compare the current value of the parameter to the threshold value; and
update a link setting of the plurality of link settings based on the determined current value of the parameter to cause the current value of the parameter to approach the threshold value.

2. The apparatus of claim 1, wherein the threshold value comprises a pre-defined reliability threshold value, the current value of the parameter comprises the TB duration, and responsive to the TB duration being less than the pre-defined reliability threshold value, the operation update the link setting of the plurality of link settings comprises:
determine a current TB value according to PW−(DT+TB), wherein DT represents a delay time (DT) duration, TB represents the TB duration, and PW represents a PW duration;
compare the current TB value to a previous TB value; and
responsive to the current TB value being greater than the previous TB value, increase the PW duration by a pre-defined PW step size.

3. The apparatus of claim 1, wherein the threshold value comprises a pre-defined reliability threshold, the current value of the parameter comprises the TB duration, and responsive to the TB duration being less than the pre-defined reliability threshold, the operation update the link setting of the plurality of link settings comprises:
determine a current a DT duration;
compare the current DT duration to a previous DT duration;
responsive to the current DT duration being greater than the previous DT duration, increase a GB duration by a pre-defined GB step size; and
update a GB efficiency threshold value.

4. The apparatus of claim 1, wherein the threshold value comprises a pre-defined GB efficiency threshold value, the current value of the parameter comprises a GB efficiency determined according to:

min{GB & DT]

wherein GB represents a GB duration and DT represent a delay time duration and responsive to the GB efficiency being less than the pre-defined GB threshold value, the operation update the link setting of the plurality of link settings comprises reduce the GB duration by a pre-defined GB step size.

5. The apparatus of claim 1, wherein the plurality of link settings comprises a periodicity, a maximum PW size, a minimum PW size, a maximum GB size, a maximum GB size, and a current modulation and coding scheme (MCS).

6. A centralized configuration device (CCD) comprising:
a memory having computer-readable instructions stored thereon; and
a processor operatively coupled to the memory and configured to read and execute the computer-readable instructions to perform or control performance of operations comprising:
determine a plurality of link settings for a communication link within a time sensitive network;
determine a protected window (PW) duration based on the plurality of link settings, wherein the PW duration is a fixed duration;
determine a delay time (DT) duration based on the plurality of link settings, wherein the DT duration is a variable duration;
determine a time buffer (TB) duration based on the plurality of link settings, wherein the TB buffer duration is a variable duration; and
successively update the PW duration to increase a schedule efficiency of the communication link within the time sensitive network, wherein the PW duration is successively updated according to:

$$\max_{PW} E[1 - (DT + TB)/PW]$$

wherein DT represents the DT duration, TB represents the TB duration, and PW represents the PW duration, and E[] represents the expectation operator.

7. The CCD of claim 6, wherein the PW duration is successively updated according to:

$P[TB \geq 0] \geq 1-\delta$ and $PW \leq PW_{max}$ wherein $PW_{max}$ represents a maximum PW duration, $\delta$ represents a maximum probability that the TB duration is greater than zero, and P[ ] represents the probability density function.

8. The CCD of claim 6, wherein the PW duration is successively updated according to a Lagrangian function defined according to:

$$E[1-(DT+TB)/PW]+D1*(P[TB\_0]-1+\delta)+D2*(PW_{max}-PW)$$

wherein DT represents the DT duration, TB represents the TB duration, PW represents the PW duration, D1 represents a first dual parameter, D2 represents a second dual parameter, $PW_{max}$ represents a maximum PW duration, $\delta$ represents a maximum probability that the TB duration is greater than zero, E[ ] represents the expectation operator, and P[ ] represents the probability density function.

9. The CCD of claim 8, wherein a minimum of the Lagrangian function is equal to D1 or D2 and a maximum of the Lagrangian function is equal to the PW duration.

10. The CCD of claim 8, wherein the PW duration is updated according to a stochastic gradient according to:

$$PW+\varepsilon[GRAD\{E[1-(DT+TB)/PW]\}-D2]$$

wherein PW represents a current PW duration, DT represents a current DT duration, and TB represents a current TB duration.

11. The CCD of claim 8, wherein the first dual parameter is updated according to a stochastic gradient according to:

$$D1-\varepsilon[P[TB\geq0]-1+\delta]$$

wherein D1 represents a current value for the first dual parameter, TB represents a current TB duration, and $\delta$ represents a maximum probability that the TB duration is greater than zero, and the second dual parameter is updated according to a stochastic gradient according to:

$$D2-\varepsilon[PW_{max}-PW]$$

wherein D2 represents a current value for the second dual parameter, PW represents a current PW duration, and $PW_{max}$ represents a maximum PW duration.

12. An apparatus comprising:
a memory having computer-readable instructions stored thereon; and
a processor operatively coupled to the memory and configured to read and execute the computer-readable instructions to perform or control performance of operations comprising:
 determine a plurality of link settings for a communication link within a time sensitive network;
 determine a threshold value for a parameter of the communication link based on the plurality of link settings, wherein the parameter comprises a time buffer (TB) duration, a protected window (PW) efficiency, or a guard band (GB) efficiency, wherein the threshold value comprises a pre-defined GB efficiency threshold value, the current value of the parameter comprises a GB efficiency determined according to:
  min {GB & DT], wherein GB represents a GB duration and DT represent a delay time duration and responsive to the GB efficiency being less than the pre-defined GB threshold value, the operation update the link setting of the plurality of link settings comprises reduce the GB duration by a pre-defined GB step size;
 determine a current value of the parameter of the communication link based on the plurality of link settings;
 compare the current value of the parameter to the threshold value; and
 update a link setting of the plurality of link settings based on the determined current value of the parameter to cause the current value of the parameter to approach the threshold value.

* * * * *